United States Patent
Yang et al.

(10) Patent No.: US 7,227,820 B2
(45) Date of Patent: Jun. 5, 2007

(54) METHOD FOR TAKING MESSAGES IN A DVD PLAYER

(75) Inventors: Ying-Chih Yang, Hsinchu (TW); Pien-Cheng Chiu, Yilan County (TW); Yuan-Ning Chen, Taipei County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 421 days.

(21) Appl. No.: 10/709,279

(22) Filed: Apr. 26, 2004

(65) Prior Publication Data

US 2005/0094985 A1 May 5, 2005

(30) Foreign Application Priority Data

Nov. 3, 2003 (TW) .............................. 92130685 A

(51) Int. Cl.
*G11B 5/09* (2006.01)

(52) U.S. Cl. ................................. 369/47.11; 369/53.21
(58) Field of Classification Search ...................... None
See application file for complete search history.

(56) References Cited

U.S. PATENT DOCUMENTS

2002/0094069 A1* 7/2002 Takahashi et al. ......... 379/93.17

* cited by examiner

*Primary Examiner*—Muhammad Edun
(74) *Attorney, Agent, or Firm*—Jianq Chyun IP Office

(57) ABSTRACT

A method of taking messages for a DVD player is provided. The DVD player includes input device, memory, a DVD play module, and an analog-to-digital converter (ADC) module. Firstly, recording the message in the memory of the DVD layer. Thereafter, waiting for a predetermined event. Finally, outputting and displaying the message. The DVD player records and outputs messages according to the DVD player in order to take messages in the present invention.

19 Claims, 2 Drawing Sheets

METHOD FOR TAKING MESSAGES IN A DVD PLAYER

CROSS REFERENCE TO RELATED APPLICATIONS

This application claims the priority benefit of Taiwan application Ser. No. 92130685, filed Nov. 3, 2003.

BACKGROUND OF INVENTION

1. Field of the Invention

This invention generally relates to a DVD player, and more particularly to a DVD player having message-taking feature and method thereof.

2. Description of Related Art

As technology proceeds, Digital Video Disc (i.e. DVD) gradually substitutes conventional audio/video apparatus, such as Video Home System (VHS) player and Video Compact Disc (VCD) player, as DVD is progressively popular in each family. However, DVD player is known for playing multimedia formats, such as movies, music, and images.

In additional, as modern life gets substantially busy, message-taking feature is more and more desired. Moreover, a plain message-taking feature does not fulfill modern and fashionable needs. Providing extra diversity is added to message-taking function, it is as well one of the methods to add DVD player's value.

SUMMARY OF INVENTION

An object of the present invention is to provide a message-taking feature for a Digital Video Disc (DVD) player and method thereof. Current hardware of a DVD player is utilized, yet a further voice and character message taking method is provided, so that a DVD player is more broadly used, and additional DVD player value is obtained.

The present invention provides a message-taking method for a DVD player. Firstly, message recording, where a message includes voice and characters, wherein message taken time and message party are also concerned. Thereafter, pausing for a predetermined event to occur, where the predetermined event can be DVD being started by user's operation, or DVD being automatically started by predetermined timer. Thereafter, DVD player displays a message that is taken, where the message includes message taken time and message party. Moreover, if an access password is required, the message will not be displayed until a password is examined correctly. Lastly, the message is outputted, that is, a voice message is played, and a character message is displayed, whereas disc is played according to the content of message or an operation of the DVD player is corresponded.

From another aspect, the present invention provides a DVD player having message-taking feature, including input device, a memory, an audio frequency ADC (analog-digital converter), and a DVD play module. The input device is for inputting signals and user's operations, the memory is for storing messages, the audio frequency ADC is for converting a audio frequency analog signal to a digital signal, and the DVD play module is for playing a DVD disc. Wherein the DVD player receives messages via the input device; if the message includes a voice message, the audio frequency ADC converts an analog audio frequency signal to a digital signal, and stores which in the memory. When a predetermined event occurs, the DVD player displays a message is taken, and output the message thereby.

Accordingly, the DVD player stores voice and characters that are recorded in the messages, and further displays the message, so that message-taking feature is achieved. Therefore DVD applies to a broader field, and its value is added.

The above is a brief description of some deficiencies in the prior art and advantages of the present invention. Other features, advantages and embodiments of the invention will be apparent to those skilled in the art from the following description, accompanying drawings and appended claims.

DETAILED DESCRIPTION

Figure 1:
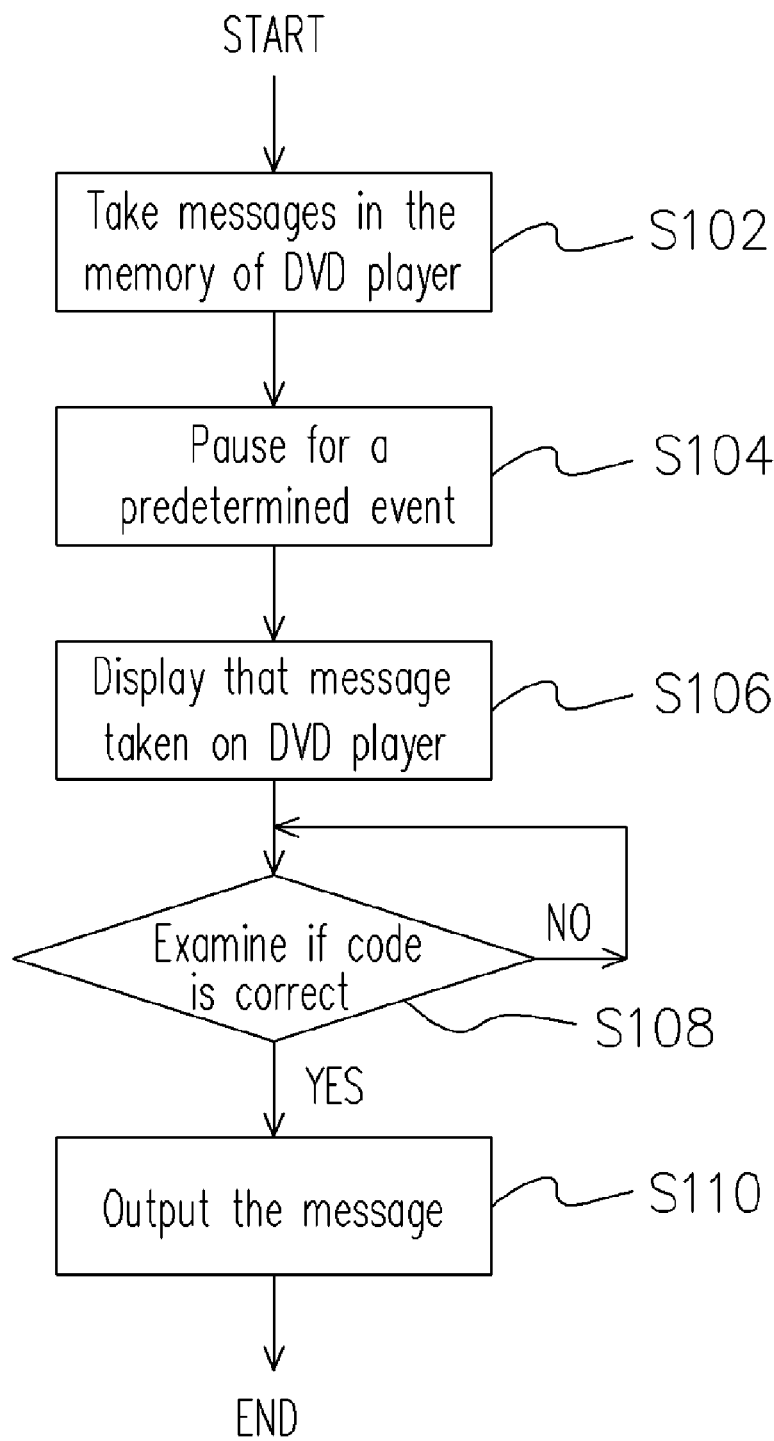
FIG. 1 is a flowchart diagram illustrating a method for taking messages in a DVD player according to a preferred embodiment of the present invention.
Figure 2:
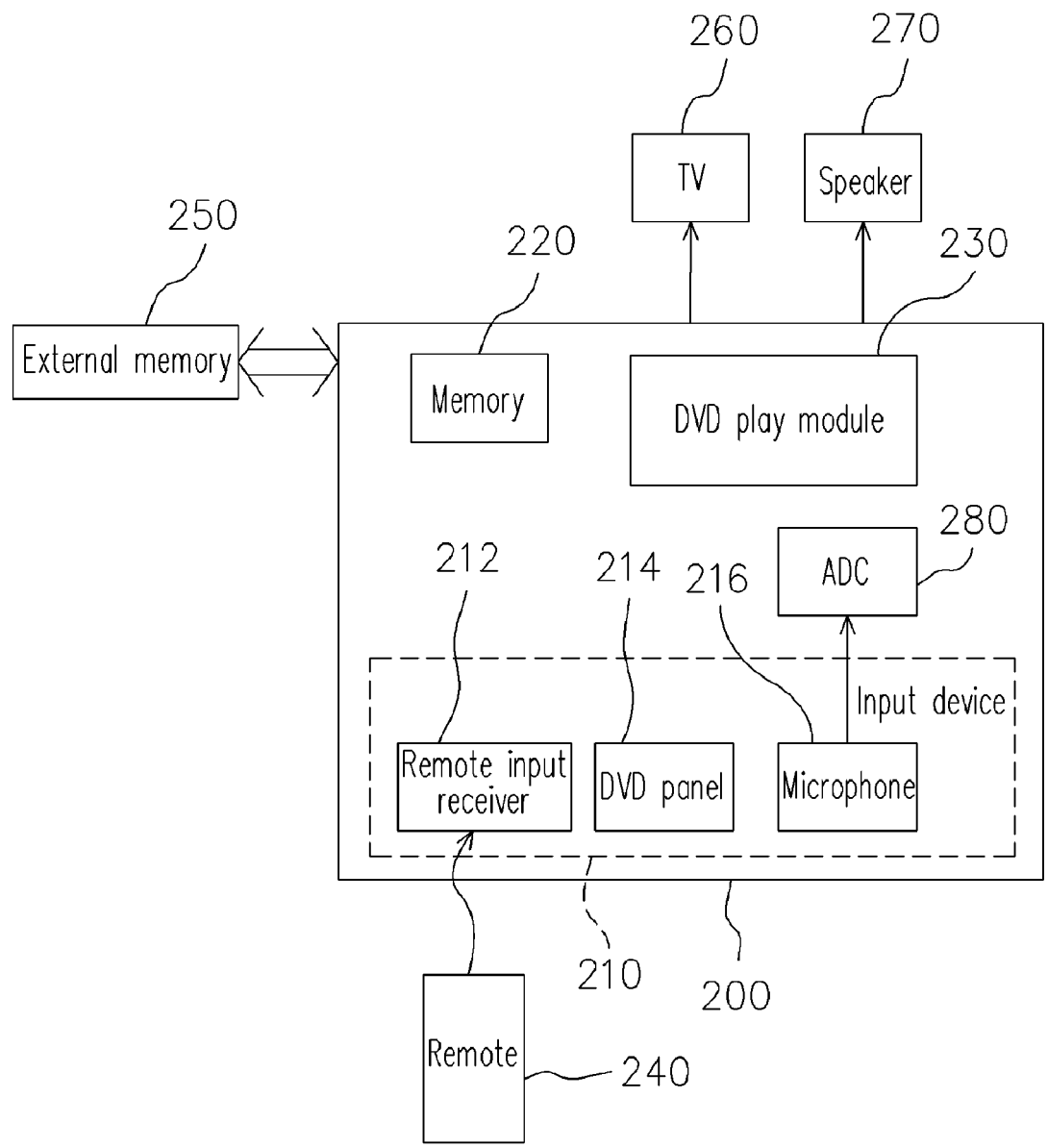
FIG. 2 is a block diagram illustrating a DVD player having message-taking feature according to a preferred embodiment of the present invention.

Referring to FIG. 1, it is a block diagram of a flowchart diagram illustrating a message-taking method for a DVD player according to a preferred embodiment of the present invention. FIG. 2 is a block diagram illustrating a DVD player having message-taking feature according to a preferred embodiment of the present invention. Referring to FIGS. 1 and 2 herein. Firstly, a user's message is taken down in voice and/or character fashion, and also taken down the time and the party (S102). Afterwards, pausing for a predetermined event to occur (S104), where the predetermined event refers to receiving an operation upon user via DVD remote control, or upon panel 214 operation, so that DVD player 200 is started, or the DVD 200 is started automatically when a predetermined time period is up. After the DVD player 200 is started, the message is displayed in a form of message time and party on TV 260 (S106). For different message parties possess different codes, a password has to be examined correct (S108) for retrieving the message. If the password is incorrect, the step is halted at S108 till the password is input correctly for proceeding to S110. Lastly, outputting the message (S110), i.e. playing voice via the speaker 270 or displaying characters via the TV 260.

In the foregoing preferred embodiment, when a user starts the DVD player 200 with the remote control 240 or via DVD panel 214 operation, or if a message is found displayed on the TV 260 after a period of time. The user examines whether the message is belonged to oneself, temptempand input a password to retrieve the messages that is left for whom. After the password is examined, the DVD player 200 outputs the voice and characters of the message, and is displayed via TV 260, and played via TV speaker 270. Thereafter, a disc is further triggered according to the message, or other corresponding operation of the DVD player 200, for example, playing the disc for the user after password is authenticated.

In the foregoing preferred embodiment, at least one set of user-defined keys is built-in for accessing personal database via DVD remote control 240 for management of the personal database, manually operation, and automatic and self-timer deleting messages. After the message is displayed, DVD player 200 is switched to standby mode or shutdown automatically. Wherein a built-in timing device in the DVD player 200 is a clock or a timer, which records the time that message is taken, whereas if the built-in timing device in the DVD player is a timer, the corresponding time interval between messages is recorded.

Referring to FIG. 2, it is illustrating a functional block diagram for a DVD player having message-taking feature according to one preferred embodiment of the present invention. In FIG. 2, the DVD player 200 having message-taking feature in this present invention includes an input device 210, memory 220, audio frequency ADC 280 and DVD play module 230. The foregoing input device 210 is for message input and user instruction input, and the memory 220 is for storing the message. Whereas the DVD play module 230 is for playing DVD discs, and the audio frequency ADC 280 is for converting audio frequency analog signal to digital signal. Wherein the DVD player 200 receives the message via the input device 210, when a voice message is obtained, the audio frequency analog signal is converted to a digital signal via the audio frequency ADC 280, and record which in the memory 220. When a predetermined event occurs, the DVD player 200 outputs the message, and displays which via TV 260 as well as plays via speaker 270.

In the foregoing preferred embodiment, the input device 210 further includes a microphone 210, a DVD panel 214, and a remote input receiver 212. The microphone 216 is for receiving voice analog signal. The DVD panel 214 is for character input. The remote input receiver 212 is for receiving data from remote 240.

In the foregoing preferred embodiment, a user's voice is input via the microphone 216, characters are input via DVD panel 214 or remote control 240. When the DVD player 200 receives the message from the input device 240, wherein if the message includes voice, the audio frequency analog signal is firstly converted to a digital signal via the audio frequency ADC 280 firstly, and then is stored in the memory 220. Where the memory can be one of a built-in DRAM (dynamic random access memory) of the DVD player 200, a flash memory, and a serial EEPROM (Electrically Erasable Programmable Read Only Memory); or a flash-EPROM used by program code, and other DVD external memory 250.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

The invention claimed is:

1. A message taking method for a DVD player, comprising:
   taking a message and examining whether a password is correct;
   pausing for a predetermined event;
   displaying the message taken on the DVD player; and
   outputting the message.

2. The message taking method as recited in claim 1, wherein the predetermined event comprises the DVD player being started when a predetermined time being up.

3. The message taking method as recited in claim 1, wherein the predetermined event comprises an operation designated by a user being received.

4. The message taking method as recited in claim 3, wherein the operation comprises at least one of a remote control operation and a panel operation.

5. The message taking method as recited in claim 1, wherein when the predetermined event occurs, the DVD player is restarted.

6. The message taking method as recited in claim 1, wherein the message comprises a voice and the outputting the message comprises playing the voice.

7. The message taking method as recited in claim 1, wherein the message comprises a character and the outputting the message comprises displaying the character.

8. The message taking method as recited in claim 1, wherein the message further comprises a message time and a message party.

9. The message taking method as recited in claim 8, wherein the outputting the message comprises playing and displaying one of the message time and the message party.

10. The message taking method as recited in claim 1, wherein the outputting the message further comprises triggering a disc and a corresponding operation for the DVD player according to content of the message.

11. A DVD player having message taking feature, comprising:
    an input device, for receiving a message and an operation from a user;
    a memory, for storing the message;
    a DVD play module, for playing a DVD disc; and
    an audio frequency analog-to-digital converter, for converting an audio frequency analog signal to a digital signal,
    wherein the DVD player receives the message with the input device, and retrieving the message if a password is examined correct, and converting the audio frequency analog signal to the digital signal with the audio frequency analog-to-digital converter, and storing the digital signal in the memory, when a predetermined event occurs, the DVD player displays the message, and outputting the message.

12. The DVD player as recited in claim 11, wherein the predetermined event comprises the DVD player being started when a predetermined time being up.

13. The DVD player as recited in claim 11, wherein the predetermined event comprises the operation designated by the user being received.

14. The DVD player as recited in claim 11, wherein the input device comprises a microphone, a panel, and a remote control receiver.

15. A message taking method for a DVD player, comprising:
    taking a message;
    pausing for a predetermined event;
    displaying the message taken on the DVD player; and
    outputting the message, triggering a disc and a corresponding operation for the DVD player according to content of the message.

16. The message taking method as recited in claim 15, wherein the predetermined event comprises the DVD player being started when a predetermined time being up.

17. The message taking method as recited in claim 15, wherein the predetermined event comprises an operation designated by a user being received.

18. The message taking method as recited in claim 17, wherein the operation comprises at least one of a remote control operation and a panel operation.

19. The message taking method as recited in claim 15, wherein the outputting the message comprises playing and displaying one of the message time and the message party.

\* \* \* \* \*